United States Patent [19]

Heaume

[11] 4,396,562
[45] Aug. 2, 1983

[54] METHOD OF PRODUCING A HOLLOW MONOBLOC BODY BY USING A BLOWING PROCESS

[75] Inventor: Jean Heaume, Laval, France

[73] Assignee: Creaplast, Paris, France

[21] Appl. No.: 196,050

[22] PCT Filed: Jul. 12, 1979

[86] PCT No.: PCT/FR79/00064

§ 371 Date: Mar. 28, 1980

§ 102(e) Date: Mar. 28, 1980

[87] PCT Pub. No.: WO80/00326

PCT Pub. Date: Mar. 6, 1980

[30] Foreign Application Priority Data

Jul. 28, 1978 [FR] France .................... 78 22359
Apr. 4, 1979 [FR] France .................... 79 08442
Jul. 4, 1979 [FR] France .................... 79 17327

[51] Int. Cl.³ .................... B29C 17/07; B29D 3/00; B32B 1/10
[52] U.S. Cl. .................... 264/23; 156/73.1; 156/245; 264/26; 264/513; 264/515; 264/516
[58] Field of Search .................... 264/512, 513, 515, 516, 264/23, 25, 26; 156/73.1, 293, 244.14, 245; 425/503, 523, 525

[56] References Cited

U.S. PATENT DOCUMENTS 3,061,104 10/1962 Schuffner .................... 210/172

FOREIGN PATENT DOCUMENTS 1253445 11/1967 Fed. Rep. of Germany .
1926231 1/1970 Fed. Rep. of Germany .
1930948 12/1970 Fed. Rep. of Germany .
1936964 2/1971 Fed. Rep. of Germany .
1473149 2/1967 France .
2201961 5/1974 France .
2338783 8/1977 France .
2394472 1/1979 France .

Primary Examiner—Jan H. Silbaugh
Attorney, Agent, or Firm—Spencer & Kaye

[57] ABSTRACT

A method of producing a hollow monobloc body in a mold which includes the steps of separating the shells of the mold from each other, interposing an element attached to a support between the shells, forming a parison between the shells and around the element, bringing the shells together to enclose the parison and the element, and producing by blowing a hollow monobloc body having an orifice therein which surrounds the element and has its interior wall spaced therefrom. The body is removed from the mold and a device inserted through an orifice in the body for welding the element to the interior wall of the body. The element is then welded to this interior wall.

3 Claims, 13 Drawing Figures

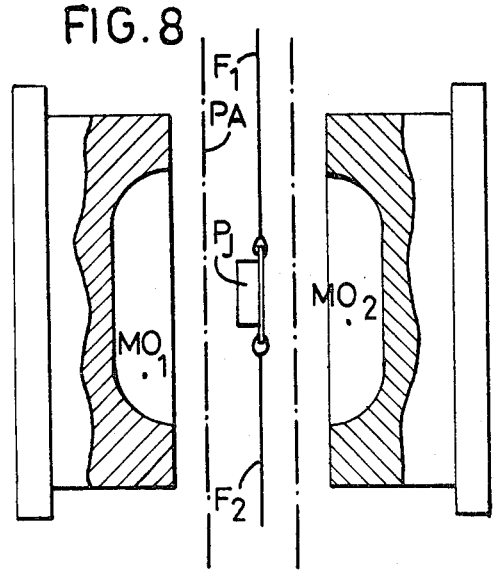
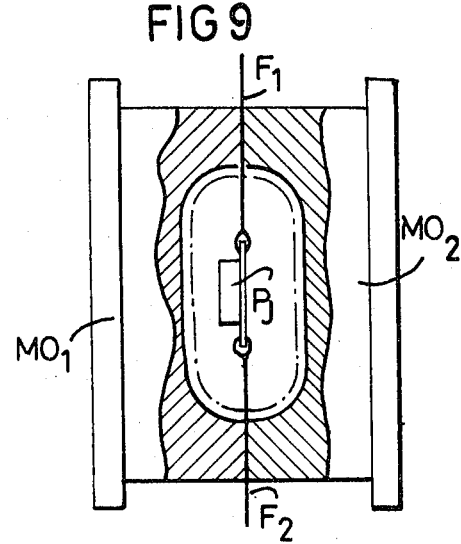
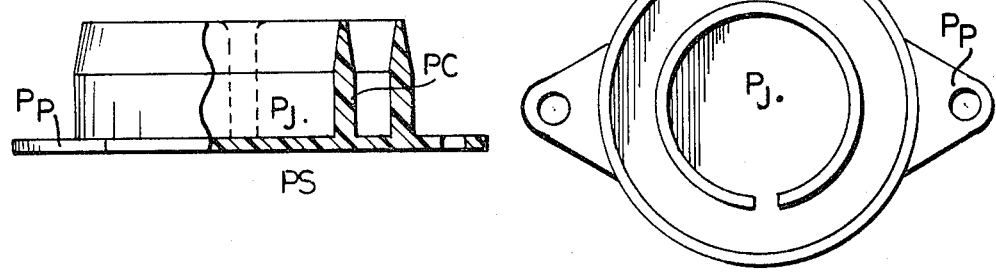
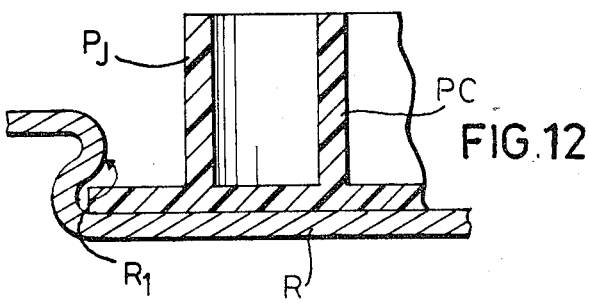
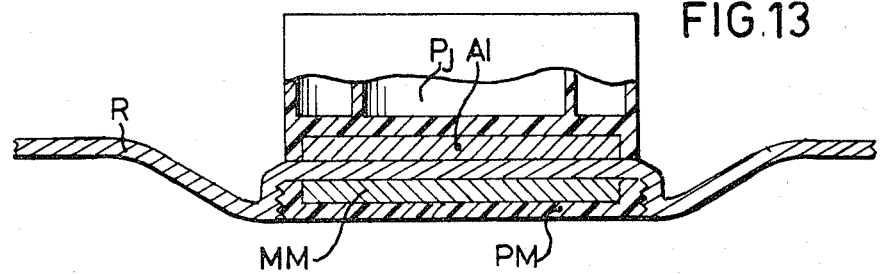

METHOD OF PRODUCING A HOLLOW MONOBLOC BODY BY USING A BLOWING PROCESS

BACKGROUND OF THE INVENTION

1. Field of the Invention

The invention relates to a method of producing a hollow monobloc body by expanding a parison made of a thermoplastic material using a blowing process, such as extrusion-blowing or injection-blowing, the body having a further element dispoed on one of its interior walls.

There are numerous cases where it is necessary to provide a further element inside a hollow body, either as a characteristic feature of the body or as a point of attachment or connection to the interior wall. When the hollow body is formed from two shells or two complementary members, such as a metal container formed by stamping or a container produced by injection moulding, it is convenient to put in place a further element which will form the desired projecting portion and to fix it to the inside of one of the shells before closing the assembly. It is not possible to use this method for one-piece containers by expanding a soft hollow parison of thermoplastic material as the size of the further element does not allow it to be introduced inside the hollow body through one of its original orifices.

2. Description of the Prior Art

It has been suggested to place the further element into the mould before the blowing process and to keep it spaced from the walls of the parison by means of a retractable support or mandrel, see, for example, French Pat. No. 1 317 649 in the name of Kautex. The further element can consequently be fixed to the interior wall after the blowing step. In all known cases, such as in the patent cited hereinbefore, the element is fixed by utilising a hole through the interior wall or the hole left behind by the support or the mandrel.

The hollow body is often used as a container or reservoir which must be air or water-tight. There is no guarantee that the spot where the element passes through the wall of the container or the reservoir is properly sealed and even less where the hole is made by the mandrel. Such a risk can not be taken as the container or the reservoir may have to be used for inflammable liquids.

SUMMARY OF THE INVENTION

The invention provides a satisfactory solution to the problem of attaching a further element to the interior of a hollow body produced in one piece by expanding a hollow parison of thermoplastic material by means of a blowing process, even if the hollow body is a container or a reservoir as it is not necessary to make a hole in the wall.

The solution is based on the conventional blowing method and the element is maintained between the shells of the mould, and is characterised by the fact that its support does not leave any trace in the wall of the hollow body. According to the invention the end of the support opposite the end carrying the further element terminates in an insert which is made beforehand of a thermoplastic material identical or compatible with that of the hollow body, so that, after moulding the insert through the wall of the body, there is an intermolecular cohesion of the materials, and the insert and the wall form a block.

More specifically, the invention comprises a method of producing a hollow monobloc body in a mold having a pair of separable shells. The method includes the steps of separating the shells of the mold from each other; interposing an element between the shells, the element being positioned by a support attached thereto; forming a parison between the shells and around the element; bringing the shells together to enclose the parison and the element; producing by blowing a hollow monobloc body having an orifice therein, the body surrounding the element and having its interior wall spaced therefrom, the element being maintained at a distance from walls of the parison before and during blowing; removing the body from the mold; freeing the element from the support; and welding the element to the interior wall of the body using an electrode or sonotrode inserted through the orifice in the body.

BRIEF DESCRIPTION OF THE DRAWINGS

Further features and advantages of the invention are given in the description and the invention will now be illustrated with reference to the drawings.

FIGS. 8 and 9 show the same stages of a third embodiment;

FIGS. 10 and 11 are an elevation and a plan view respectively of an embodiment of a further element being attached by clasping;

FIG. 12 shows the assembly attached by clasping; and

FIG. 13 is a further embodiment showing attaching the element by magnetic retention

DESCRIPTION OF THE PREFERRED EMBODIMENT

By way of example the method of attaching a further element PJ comprising a "trap" in a chamber R of a carburetor will now be described. The further element PJ comprises a base PS from which interior walls PC project.

In a first embodiment the further element PJ is placed at the free end T1A of a rigid rod T1. The other end of the rod is integral with an insert T1B. The further element PJ is conveniently provided with a hole PO through the centre for engaging the end T1A. The insert T1B may be integral with the rod T1 or may be temporarily joined thereto. If it is integral with the rod it will remain thereon after the blowing step, otherwise it can be removed afterwards.

Whatever mode is chosen, the material constituting the insert T1B is similar to that of the hollow body or is at least compatible therewith so as to provide a true intermolecular cohesion between the materials after moulding.

Figure 1:
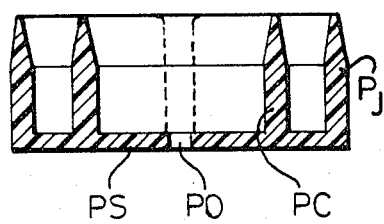
FIGS. 1 and 2 show an embodiment of a further element in elevation and plan view respectively.
Figure 2:
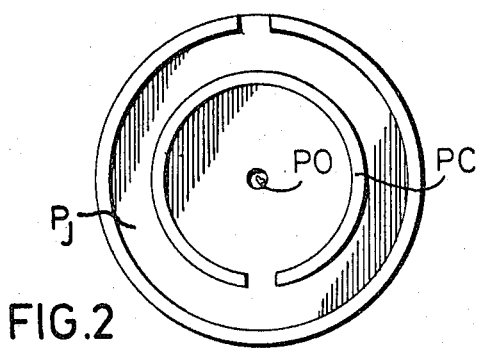
Figure 3:
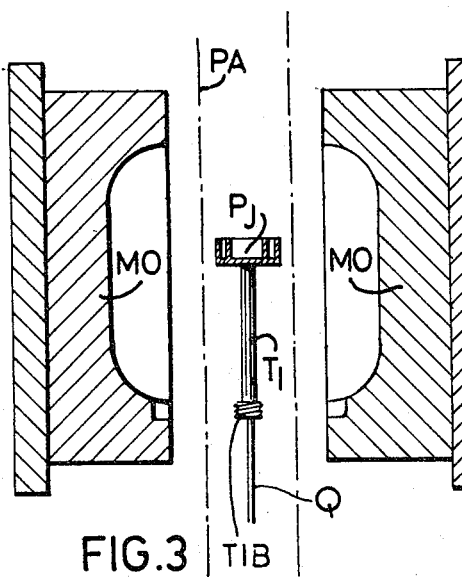
FIG. 3 shows a preliminary blowing stage after the further element has been introduced into the interior of the mould.

In FIG. 3 the insert T1B extends in a tail-piece Q for attaching it to the shells of a mould MO and for centering the rod T1 and the element PJ in the interior of the hollow parison.

Figure 4:
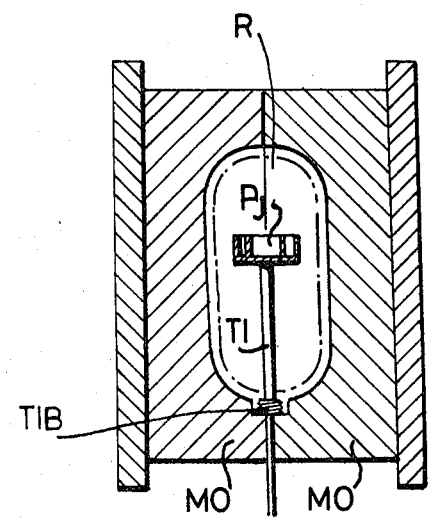
FIG. 4 shows the final blowing phase.
Figure 5:
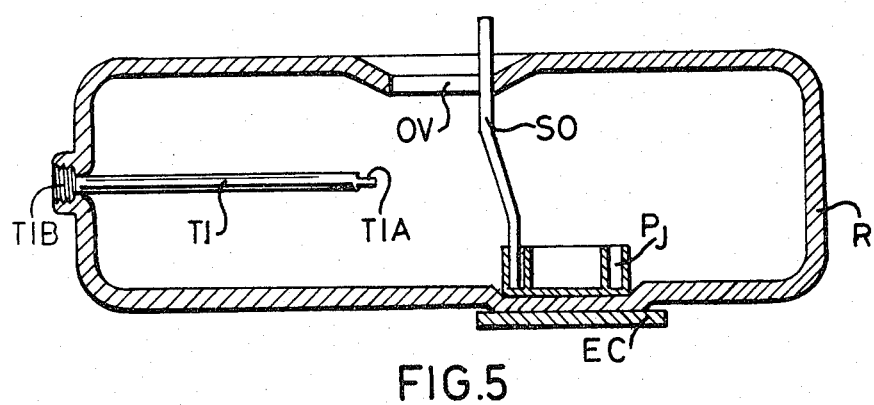
FIG. 5 shows a hollow body with one end being provided with a further element during the joining stage.
Figure 6:
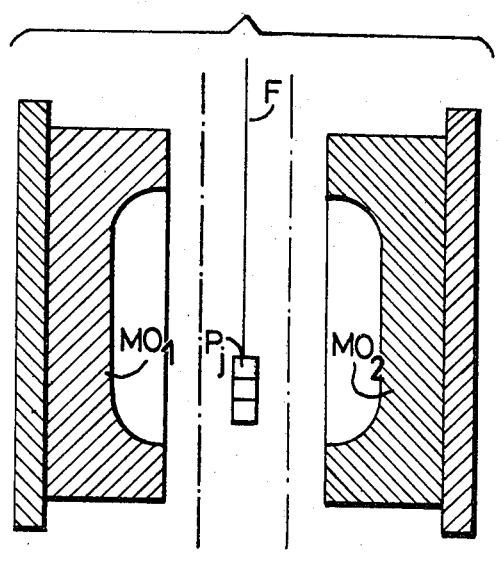
FIGS. 6 and 7 show the stages before and after blowing of a second embodiment.
Figure 7:
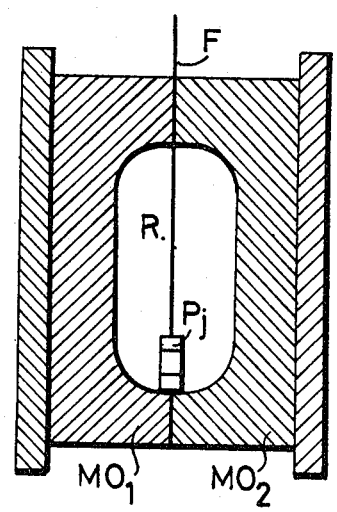

FIGS. 4 and 5 show the insert T1B after having formed a block with the wall of the chamber R after the blowing operation. In a further embodiment of the invention (FIGS. 6 and 7), the element PJ is suspended by a wire F passing through a notch in shells $MO_1$ and $MO_2$. The material of the wire is similar to that of the hollow body or is at least compatible therewith so that, after the blowing step, there will be a true intermolecular cohesion between the wire and the hollow body resulting in a continuity of the wall without any defect.

In a yet further embodiment (FIGS. 8 and 9), the element PJ is integral with two taut wires F1 and F2 which pass through notches in the shells $MO_1$ and $MO_2$. As in the previous embodiment and for the same purpose, the material of the wires is similar to that of the hollow body or is at least compatible therewith so that, after the blowing operation, there will be a true intermolecular cohesion between the wires and the wall.

It is obvious that several wires arranged in stays may be used. After the blowing operation the wire support or supports are freed in order to attach the element PJ to the interior wall R. No matter how the element is supported before blowing, attaching thereof after blowing is ensured. Various means may be utilised but all have one point in common: it is not necessary to pierce the wall for attaching the further element. There are several ways of attaching the element such as high frequency or ultrasonic welding, clasping and magnetic retention.

In order to carry out the various methods of attaching the element, a device is inserted into the hollow body through one of its original orifices OV such that its free end rests against the element PJ in the position of attaching.

In FIG. 5 the device (in this case a sonotrode SO) pushes the element PJ against the wall, at the other end of which there is an anvil EC.

If the further element PJ is provided with perforated flanges PP (FIGS. 10 and 11) or a peripheral band, it may be clasped by exerting pressure by means of a device inserted through an original orifice into a space or groove R1 obtained by deforming the wall of the hollow body (FIG. 12).

Finally, as shown in FIG. 13, the element PJ may be attached to the wall by means of a magnetic element MM in the form of an external insert provided the element PJ is integral with a magnet. It is obvious that the magnet can be placed outside the wall and the magnetic element within the wall. This method may be used when the further element is made wholly of iron.

POSSIBILITY OF INDUSTRIAL APPLICATIONS

The invention is especially suitable for manufacturing a carburetor chamber for a car which comprises a further element in the form of a trap as described hereinbefore. It is obvious that the material which is most suitable for intermolecular cohesion between the wall and the insert is an olefin.

I claim:

1. The method of producing a hollow monobloc body in a mold comprising a pair of separable shells, said method including the steps of:
    separating the shells of said mold from each other;
    interposing an element between said shells, said element being positioned by a support attached thereto;
    forming a parison between said shells and around said element;
    bringing said shells together to enclose said parison and said element;
    producing by blowing a hollow monobloc body having an orifice therein, said body surrounding said element and having its interior wall spaced therefrom, said element being maintained at a distance from walls of said parision before and during said blowing;
    removing said body from said mold;
    freeing said element from said support; and
    welding said element to the interior wall of said body using an electrode or sonotrode inserted through the orifice in said body.

2. The method defined by claim 1 wherein said support comprises a rod having one end attached to said element, and wherein the other end thereof comprises an insert composed of a thermoplastic material which is compatible with the thermoplastic material of said body, said insert adhering to the wall of said body by intermolecular cohesion to form a continuous block with said body prior to the step of removing said parison from said mold.

3. The method defined by claim 2 wherein said insert is heated to provide adherence to the wall of said body.

* * * * *